B. DYSART.
ADDING MACHINE.
APPLICATION FILED AUG. 23, 1909.

1,145,574.

Patented July 6, 1915.
9 SHEETS—SHEET 1.

B. DYSART.
ADDING MACHINE.
APPLICATION FILED AUG. 23, 1909.

1,145,574.

Patented July 6, 1915.

Attest:
Charles Pickles
L. C. Kingsland

Inventor:
Birney Dysart,
By J. D. Rippey, atty

B. DYSART.
ADDING MACHINE.
APPLICATION FILED AUG. 23, 1909.

1,145,574.

Patented July 6, 1915.
9 SHEETS—SHEET 4.

Attest:
Charles Pickles
L. C. Kingsland

Inventor:
Birney Dysart,
by J. D. Rippey,
Atty

B. DYSART.
ADDING MACHINE.
APPLICATION FILED AUG. 23, 1909.

1,145,574.

Patented July 6, 1915.
9 SHEETS—SHEET 6.

Fig. 12.

Attest
Charles Pickles
L. L. Kingsland

Inventor:
Birney Dysart.
By J. D. Rippey
atty

UNITED STATES PATENT OFFICE.

BIRNEY DYSART, OF ST. LOUIS, MISSOURI, ASSIGNOR, BY MESNE ASSIGNMENTS, TO THE DALTON ADDING MACHINE COMPANY, OF CINCINNATI, OHIO, A CORPORATION OF OHIO.

ADDING-MACHINE.

1,145,574. Specification of Letters Patent. Patented July 6, 1915.

Application filed August 23, 1909. Serial No. 514,313.

*To all whom it may concern:*

Be it known that I, BIRNEY DYSART, a citizen of the United States, residing at St. Louis, Missouri, have invented a new and useful Improvement in Adding-Machines, of which the following is a specification.

This invention relates to adding machines of that class embodying a movable carriage in which are mounted several series of pins adjustable to represent or register numbers. One type of such a machine is illustrated in the patent to Helmick re-issued December 27, 1904, No. 12,296, and a further exemplification of a machine of this character of an advanced or improved type is set forth in the application of Hubert Hopkins, Serial No. 140,390, filed January 24, 1903, and the British Patent No. 854 of 1904. In each of these machines there is a carriage containing several series of pins and a single series of keys for the different figures from "1" to "9" and including "0." These keys are operable to set the pins in the carriage to represent or register numbers and cause the carriage to move to proper position wherein it may coöperate with the adding and recording mechanisms. In these machines, and so far as I am informed in all machines that have ever been constructed with a movable carriage register of that general type, the carriage is moved one step at each key operation the same for the digits and the "0" characters, irrespective of the number of characters contained in the number to be registered, which renders it necessary to strike a key once for each figure in the number that is intended to be set up or registered in the carriage. Many numbers found in lists to be computed on these machines contain a plurality of ciphers or "0" characters, such, for instance, as $40,000.00. In the Helmick and Hopkins devices as illustrated and described in said patent and said application, in order to set up or register this number in the carriage, it would be necessary to strike the "4" key first, and then strike the "0" key six times consecutively.

The present invention, comprising mechanism coöperating with the carriage and its escapement whereby the carriage and pins may be set or adjusted to represent or register any number of "0" characters following one or more digits in the number by a single operation of the novel form of carriage-control or tabulating mechanism. This carriage-control or tabulating mechanism comprises a series of tabulating keys arranged in convenient relation in the keyboard and operable respectively for causing the carriage to move two, three, four, etc., spaces at a single operation, thereby dispensing with the necessity of successive operations of the "0" key. These tabulating keys do not affect the pins in the carriage other than to cause the carriage to transport them to proper position with respect to the adding and recording mechanisms. This involves a change in the arrangement of the pins for "0" from the arrangement of such pins as found in the said Helmick patent and Hopkins application in which the pins for "0" as well as the pins for the remaining digits in idle position of the carriage are in unset position and are moved to operative or set position only when the keys are operated.

The present invention comprises a series of "0" pins which are normally in operative or set position and only require movement of the carriage to transport them to their proper registering position with respect to the adding and recording mechanisms. When any digit key is operated to set a digit pin, the "0" pin in that series will be moved to unset position at the same time that the digit pin moves to set position, after which movement of the pins the carriage travels one space as required to bring the pins in proper position with respect to adding and recording devices.

In a companion application filed by James L. Dalton and myself on March 29, 1909, numbered serially 486,498, there is disclosed a form of tabulating mechanism coöperating with the carriage whereby the carriage may be moved to position to represent a plurality of "0's" by the single operation of the tabulating key. By the invention as described in said application, the carriage escapement is released to permit the carriage to move until it is stopped by a stop interposed by the operation of the operated tabulating key. After such operation of any one of the tabulating keys, it is impossible to set up or register any other digits in lower orders from the "0" already represented, for the reason that the stop operated by the tabulating key cannot be displaced to permit further travel of the carriage. The present invention overcomes this deficiency and permits any number of "0's" to be set in operative position, and also permits additional movement of the carriage for the purpose of registering the digits in lower orders. Each tabulating key also is operable effectively to cause the carriage to move a like number of spaces, irrespective of the number of digits already set up in the carriage, which operation also is different from that of the co-pending application referred to.

In the accompanying drawings Fig. 5 is a perspective view showing the keys between the tabulating keys and parts operated thereby.

Figure 9:
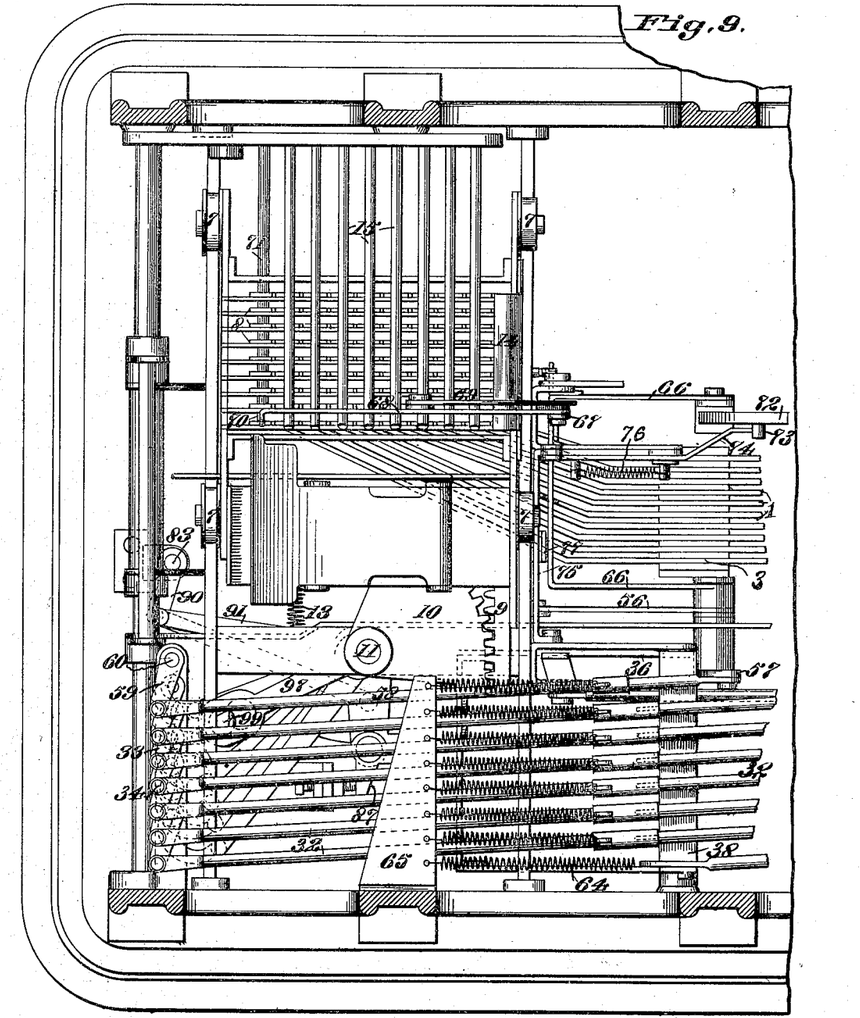
Fig. 9 is a plan view of the carriage, the carriage-control mechanism and the tabulating devices.
Figure 10:
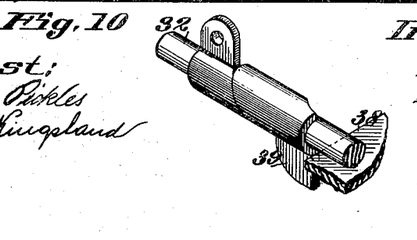
Fig. 10 is a perspective view of a portion of one of the links leading from the tabulating keys showing the parts operable thereby for releasing the escapement.

In a register-carriage machine of the type above referred to as exemplified in the said patent and applications, and as known commercially, there is a series of key levers 1 having their terminals or finger pieces 2 arranged in suitable relation upon a keyboard. These levers are pivoted at 3 and rearwardly therefrom extend obliquely toward one side of the machine as shown in Fig. 9, and are provided with vertical extensions or hammers 4 which are arranged in substantially the same vertical plane. This is the arrangement of all the keys except the "9" key on which there is no extension. Above the rear ends of the key levers 2 parallel rails 5 are mounted and a carriage 6 has its supporting rollers 7 operating on said rails. Within said carriage are several series of pins 8 which are movable substantially vertically. In idle or rest position of the carriage the row of pins at the left relative to the operator is above the extensions or hammers 4 on the key levers and are arranged in like series so that when the key lever is operated it will drive upwardly the corresponding pin in the first row in the carriage. The carriage has a rack 9 which meshes with the gear segment 10 attached to the escapement shaft 11. In this machine also is found an escapement bar 12 (Fig.12) extending transversely upon the key levers, which, through coöperating escapement mechanism hereinafter explained, is entrained with the escapement shaft 11. As the keys are operated this escapement bar will also be operated effectively to permit leftward movement of the carriage one step or space at each operation, such movement being effected by any suitable form of actuating devices, such, for instance, as by a connecting spring 13 (Fig. 10). Operation of any key lever in these known machines also operates the escapement bar effectively to permit the carriage to move one step toward the left with respect to the operator which is sufficient to place another row of pins in the carriage over the key lever terminals or hammers 4, which may then be operated to set up one pin in this row. The pins are arranged in series from "0" at the rear to "8" at the front of the carriage, there being a permanent stop-piece 14 attached to the front end of the carriage for the 9's, said piece extending across in front of all the rows of pins in the carriage. Therefore while the "9" key will not set up any pin in the carriage, it will operate the escapement bar and permit movement of the carriage laterally. The key levers operate the escapement bar 12 the same as in the machine of the Hopkins British patent and United States application, but the devices whereby said bar are entrained with and control the shaft 11 are novel. These novel devices are under control of the tabulating keys and are hereinafter described in detail.

Above the carriage is a pin-restoring device consisting of a series of arms or bars 15 under which the carriage moves when returned to idle position, and against the under sides of which the upper ends of the raised pins are moved effectively to depress said pins to their lower or idle position. These arms or bars cause the depression, or restoration to idle position, of the pins 8 when the carriage is moved to its idle position which is under said arms or bars, because said arms or bars are located below the planes of the upper ends of the up-raised pins and, therefore, depress said pins when they are rubbed thereagainst by the movement of the carriage. The inner ends of said arms or bars are turned obliquely upwardly so as to enable the pins to start thereunder and be depressed by the sloping surfaces of the arms or bars against which they are rubbed as the carriage moves. Lateral movement of the carriage through operation of the keys and the escapement, places the pins which are set in proper position to be engaged by the gear devices 16 by which the recording and adding mechanisms are controlled.

The carriage is automatically returned to idle position at the right of the machine relative to the operator after each number has been recorded or added, said operation being effected by the rack 17 meshing with the segment 18 mounted loosely on the escapement shaft and having a projection 19 adapted to engage with a like projection on the part 20 rigid with the escapement shaft. Movement of the rack may be effected in various ways, and after moving the carriage to its idle position the rack is moved forwardly to its idle position in which the segment 18 holds the projection 19 thereon away from the projection on the arm 20 to permit leftward movement of the carriage when the keys are operated.

Figure 7:
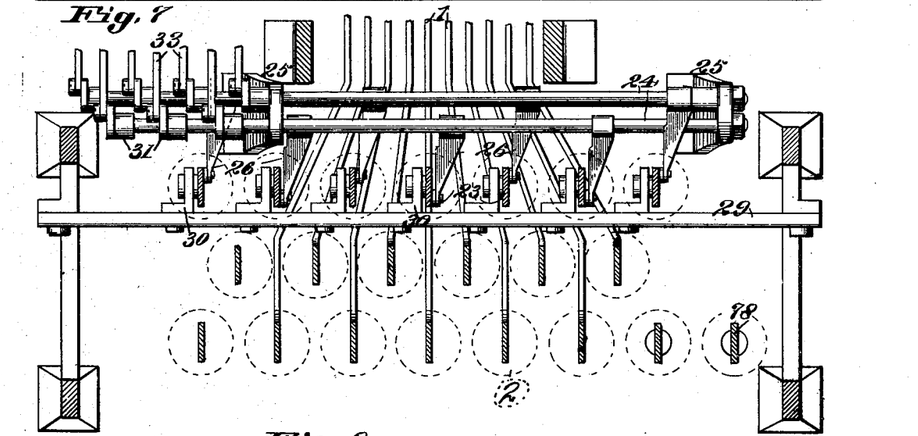
Fig. 7 is a sectional view on the line a—a of Fig. 3.

These machines also include what is known as a main or operating shaft 21 adapted to be rocked by a handle or lever 22 each time a number is recorded or added. The subject matter of the present invention coöperates with the mechanism above described and enables the operator to move the carriage one or more spaces at a single movement. This mechanism includes a series of tabulating keys having connection for coöperating with the escapement mechanism to cause the carriage to be drawn leftwardly until stopped by an interposed pin adjusted by operation of the tabulating keys. In the construction shown there is a set of tabulating keys 23 arranged in a row in the keyboard. A series of rods 24 are supported in bearings in uprights 25, there being one rod for each of the keys 23. An arm or lever 26 is attached to each rod 24, said arms terminating adjacent to the stems of the respective keys. The stem of each key is connected to its lever 26 by pin-and-slot connection 27, whereby the depression of any key will rock the corresponding rod 24. The keys are guided by brackets 28 on the cross bar 29. The stems of the keys also having pin-and-slot connection 30 with said brackets. In the construction shown the uppermost rod 24 is thus connected with the key 23 at the right of the key board with respect to the operator. The next lower rod is connected to the second key, and so on with the entire row of keys, the lowermost rod being connected with the key at the left. The left ends of the rods are arranged in staggered relation as shown in Figs. 6 and 7, the upper rod being the shortest and the lowest rod being the longest.

Figure 3:
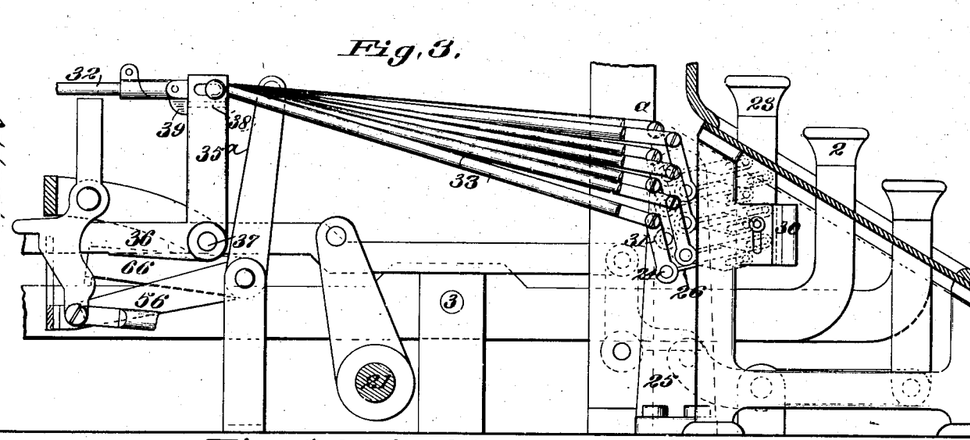
Fig. 3 is a sectional view of the keyboard portion of the machine illustrating the connections from the tabulating keys.
Figures 4, 6:
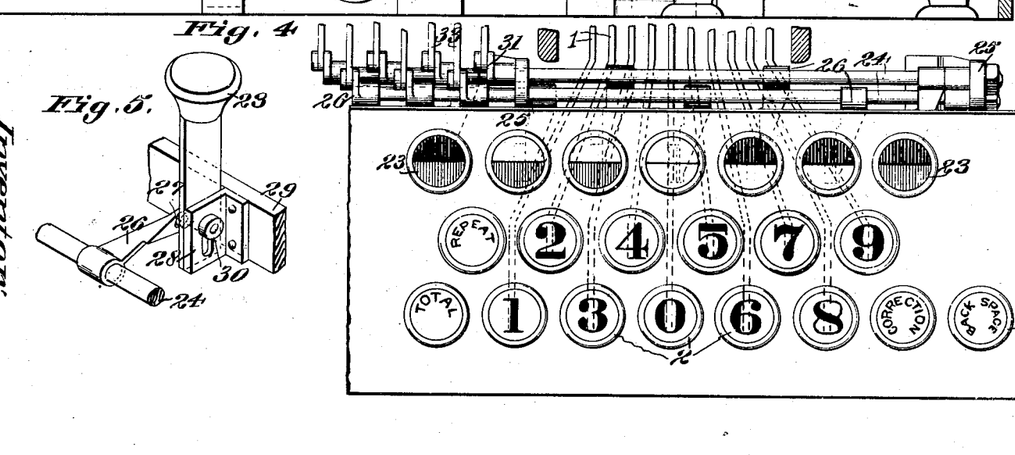
Fig. 4 is a plan view of the keyboard.
Fig. 6 is a vertical sectional view taken in front of the row of tabulating keys.
Figure 6:
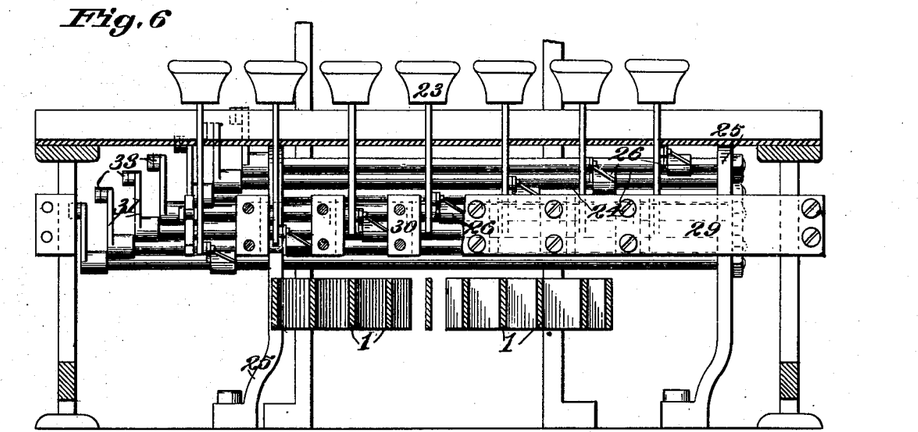
Figure 8:
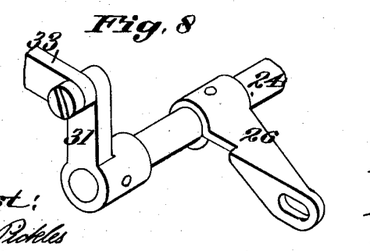
Fig. 8 is a perspective view of a portion of one of the connecting devices leading from the tabulating keys to the escapement mechanism.

To the left end of each rod 24 an upwardly extending arm 31 is attached (Figs. 3, 6 and 8). Links 32 extend from said arms respectively and are connected to the ends of arms 33, (Figs. 9, 12 and 13) attached to the upper ends of vertical rods 34 mounted in the supporting frame 35 near the rear of the machine. The link 32 constituting the connection from the key 23 at the left, which is also the key for causing the greatest movement of the carriage at a single operation, is pivoted to a vertical arm 35$^a$ attached to a bail 36 pivotally mounted at 37 (Fig. 3). The opposite arm of the bail also has a vertical arm corresponding to the arm 35$^a$, and between said two arms immediately below the links 33 a bar 38 is supported (Figs. 3 and 9). Each of the links 32, except the one at the left which is pivoted directly to the arm 35$^a$, has a projection 39 bearing against the rear of the bar 38 (Figs. 3 and 10), whereby depression of any one of the tabulating keys will move forwardly the bar 38 and the vertical arm supporting the same, and thereby raise the rear portion of the bail 36 to which said arms are connected.

Figure 11:
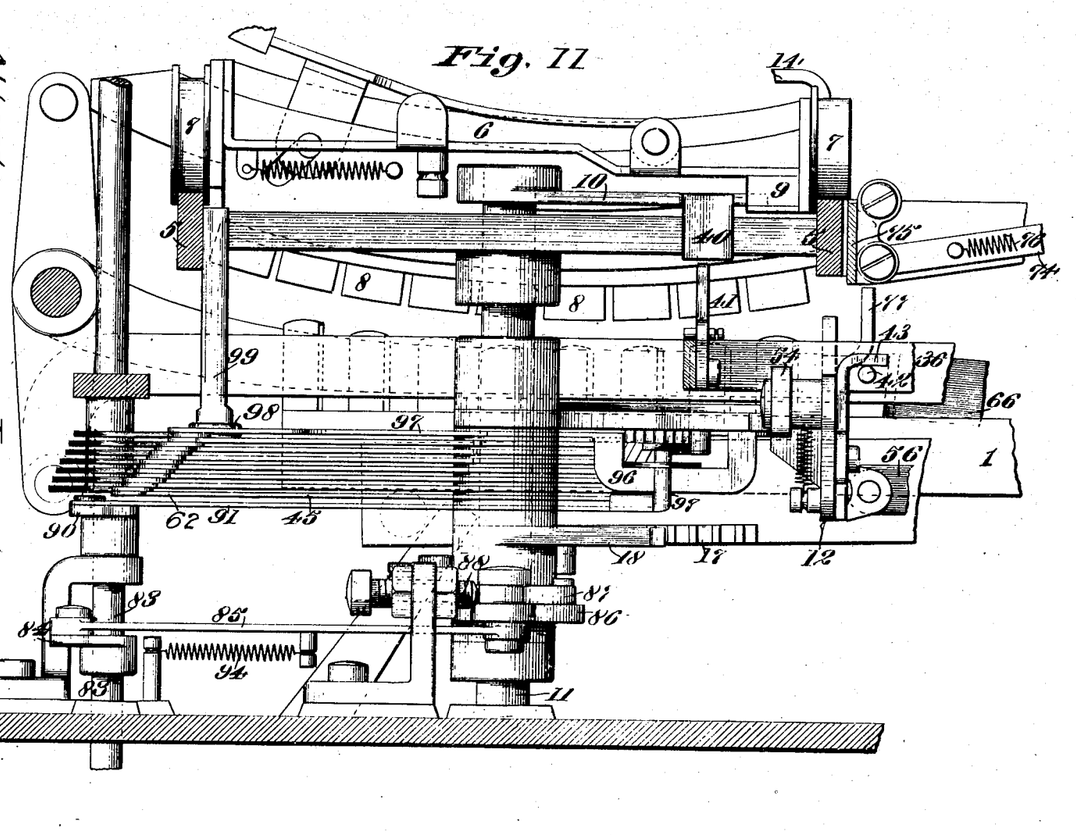
Fig. 11 is a side elevation of the tabulating and escapement mechanisms.
Figure 12:
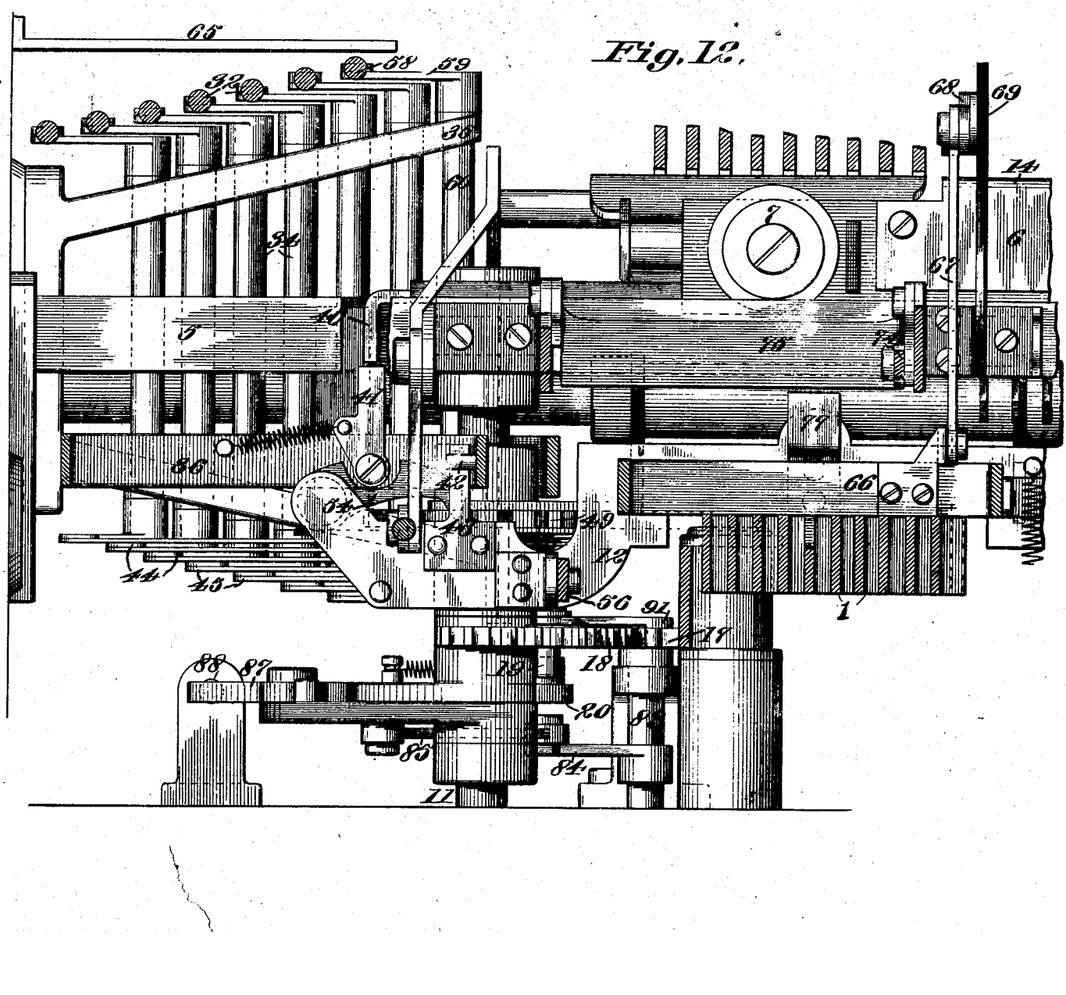
Fig. 12 is a front elevation thereof.
Figure 13:
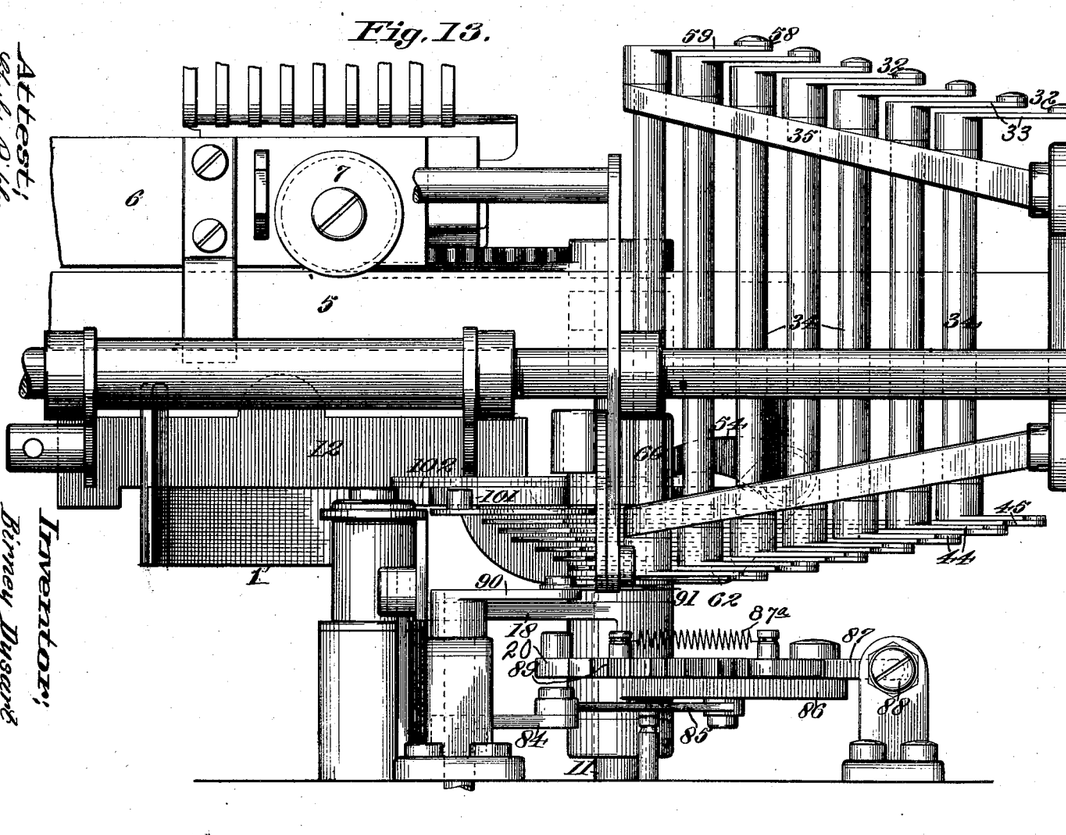
Fig. 13 is a rear elevation of the tabulating devices.

On the segment 10 is a depending lip 40 which, in idle position of the carriage and of the shaft 11, is immediately above a pivoted locking plate 41 supported by the bail 36 (Figs. 11 and 12). This prevents movement of the bail and of the tabulating keys until after the carriage has been moved one or more spaces toward the left by the operation of one or more digit keys. The first step of the carriage leftwardly, however, moves the lip 40 beyond the member 41, after which any one of the tabulating keys may be operated. The escapement bar 12 will also be operated by the tabulating keys, there being a projection 42 on the bail 36 extending under a hook 43 on the escapement bar, whereby operation of the bail will raise said escapement bar but will permit operation of said bar by numeral keys without corresponding movement of the bail 36.

A curved arm 44 (Fig. 14) is attached to the lower end of each of the vertical rods 34.

Figures 20, 21, 22, 23:
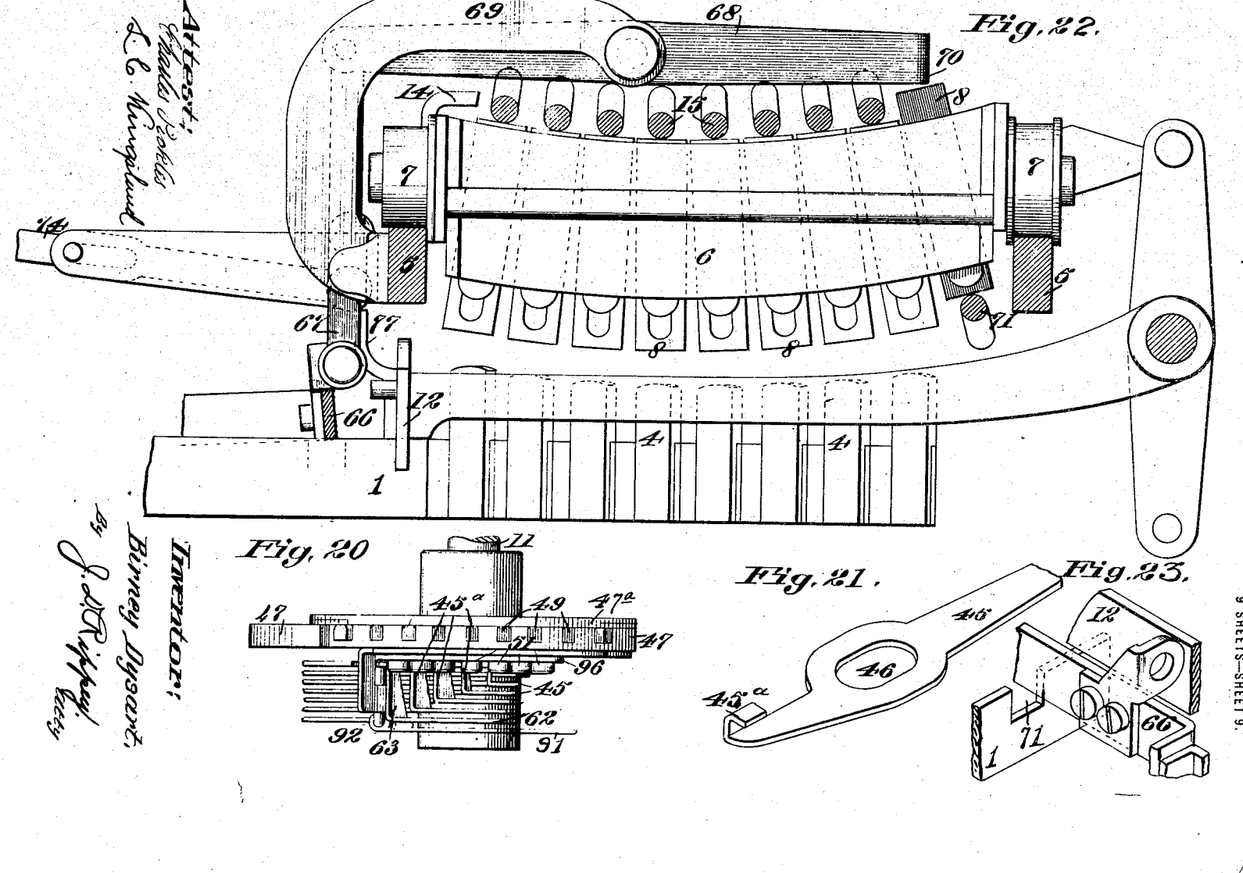
Fig. 20 is a side elevation of the escapement devices and the links for operating the escapement pins.
Fig. 21 is a perspective view of one of the links detached.
Fig. 22 is a side elevation of the register or pin carriage and the ends of the keys.
Fig. 23 is a perspective view showing the construction of the "0" key lever and its relation to the escapement bar.

A link 45 is pivoted to each of the arms 44, said links being nested at the shaft 11, having elongated holes 46 (Fig. 21) to receive said shaft. These links project forwardly beyond the shaft 11 as shown in Fig. 11.

Figures 14, 15, 16, 17, 18, 19:
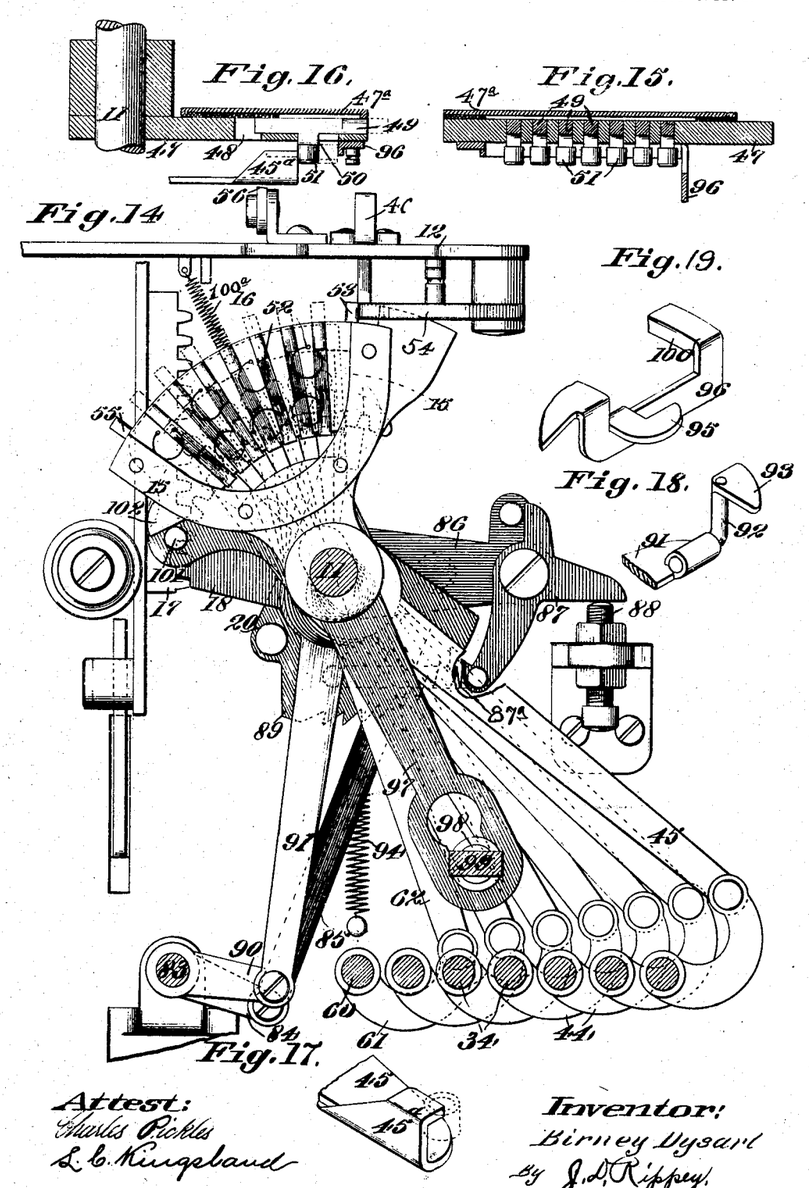
Fig. 14 is a detailed view of the novel escapement mechanism comprising a part of the present invention.
Fig. 15 is a cross sectional view of the escapement pins and supporting plate.
Fig. 16 is a sectional view thereof taken parallel with one of the escapement pins.
Fig. 17 is a perspective view of the end of one of the links whereby the escapement pins are operated.
Fig. 18 is a perspective view of pin-setting devices coöperating with the back-step mechanism.
Fig. 19 is a similar view of the retainers for the pin setting device.

The escapement mechanism controlling step by step movement of the carriage, and which is itself controlled by the escapement bar 12, includes a segmental plate 47 which is attached to the escapement shaft 11 and is provided with a series of radial channels 48 within which are mounted sliding escapement pins 49, each of which has a projection 50 extending downwardly through a slot in the supporting plate and preferably carries a small roller 51 below the escapement plate. In normal or idle position these sliding pins are in retracted position in the channels as shown in Fig. 14, being yieldingly retained in such position by the small springs 52, one of which is connected to each pin and the escapement plate 47. Said springs are also effective to hold the pins in their outward positions as will be obvious by reference to Fig. 14. A plate 47ª covers the escapement pins, protecting them from foreign substances and holding them from displacement.

A stationary projection or tooth 53 on the escapement plate in idle position of the carriage engages with the escapement pawl 54 supported by the escapement bar 12. A second projection 55 nearer the opposite end of the plate 47 defines the extent to which the carriage may be moved in any instance, and the sliding pins 49 are supported between the two projections 53 and 55 at equal distances from each other. When any one of the numeral keys is operated therefore, it is necessary that the first pin 49 be moved radially in order to constitute an abutment for the escapement pawl 54. For accomplishing this movement I provide connections from the key levers 1 whereby, at each operation of any of said levers, one of the pins 49 will be moved. An arm 56 forms, with another arm 57 which is vertical, a bell crank lever (Fig. 9). The arm 56 extends rearwardly in substantially a horizontal plane, and is pivoted to the escapement bar 12 so that when any key lever 2 is operated the bell crank lever will be rocked. A link 58 has its front end pivoted to said arm 57 and its rear end to the arm 59 attached to the rod 60 mounted in the frame 35. The lower end of the rod 60 is connected to an arm 61 (Fig. 14) through which a link 62, similar to the links 45 and guided similarly by the shaft 11, extends toward the escapement segment. The front end of the link 62, which is below all of the links 45, is provided with a vertical extension 63 (Fig. 20) terminating adjacent to the projection 50 on the escapement pin 49 next to the permanent tooth 53.

From the foregoing it will be seen that operation of any one of the keys 2 will cause the link 62 to be moved forwardly, causing its projection 63 to engage with the roller on the projection 50 in advance thereof. This pushes outwardly the pin 49 into the path of the escapement pawl 54 and, as the escapement plate 47 is turned by the movement of the carriage, the pin which had been set will constitute an abutment for the pawl, thereby stopping the escapement and the carriage in position to place the next row of pins in the carriage over the key terminals or hammers 4. This movement of the escapement pawl also brings the projection 50 and the roller thereon on the next pin 49 in front of the projection 63, and successive operation of the keys 2 will successively move the pins 49 outwardly, causing the carriage to be moved step by step across the machine as the digits in the number are successively set up in the carriage. It will be noted also that the carriage may move until stopped by one of the pins 49, and that unless one of said pins is moved the carriage could move to the full extent possible, that is until stopped by engagement of the permanently positioned tooth 55 with the escapement pawl.

The arms 45 are also provided with projections 45ª and are operable by the tabulating keys effectively to push outwardly the pins 49 as said pins move across in front of said projections 45ª. It will be seen by reference to Fig. 20 that the projections 45ª become successively shorter toward the uppermost link 45 on which there is no projection since the end of said uppermost link is in the same horizontal plane with the projections 50 on the pins 49.

The links 32 as well as the link 58 are actuated rearwardly by springs 64 connected to said links and to the arm 65 rigid with the frame of the machine. Said springs restore the tabulating keys and the parts connected therewith to idle position after each operation, the scope of movement of the parts being determined by the length of the slots in the brackets 28, and by the elongated holes 46.

The transverse row of pins 8 at the rear of the carriage (Fig. 22) representing "0" are normally in operative or set position. It is, therefore, necessary that when the other pins are utilized to register or represent numbers the "0" pins shall be pressed downwardly to idle position. A bail 66 extends across the rear portions of the key levers 1 (Figs. 9 and 12). A link 67 has its lower end pivoted to the bail 66 and its upper end is pivoted to the lever 68 carried by a bracket 69 (Fig. 22) and extending rearwardly over the carriage. Said lever 68 is provided with a hammer or driving portion 70 which in idle position of the carriage is above the "0" pin at the left with respect to the operator. Operation of any one of the figure keys except the key for "0" will raise the bail 66 and cause the hammer portion 70 of the lever 68 to depress the "0" pin therein, at the same time that any other pin in that series is raised by the key hammer 4. The carriage then moves one space leftwardly, bringing another row of pins over the key terminals and the "0" pin in that row under the driving portion 70. Successive operations of the number keys will repeat this operation.

As stated above, the operation of the "0" key while operating the escapement bar 12 and causing the carriage to be moved leftwardly, does not affect the bail 66, there being a notch 71 in the "0" key lever, permitting it to be operated without engaging the bail 66. This permits the carriage to move as required to transport the "0" pins therein to operative position with respect to the adding and recording mechanisms. When the carriage returns to idle position any "0" pins therein which had been depressed will be raised again to their set or operative positions by a restoring bar or arm 71$^a$ similar to the parts of the restoring device 15 whereby the remaining pins are depressed. In this way, when the carriage is in idle position all of the "0" pins are maintained in elevated or set position, while all of the remaining pins in the carriage are held depressed in their idle or inoperative adjustments.

As above stated in mentioning the shaft 21 and the handle 22, said shaft is rocked after each number to be added and recorded is set up in the carriage. The initial movement of the shaft causes all of the number keys as well as all of the tabulating keys to be locked against operation so that there can be no additional movement of the carriage until after the number previously set up therein has been cleared. Upon the shaft 21 is a segmental arm 72 provided with a pin 73 which in idle position of the shaft engages the front end of the link 74. The rear end of the link 74 is pivoted near the lower edge of the swinging plate 75 suspended in a bracket supported by a front rail 5. A spring 76 connecting the link 74 with a stationary part, actuates said link and the plate 75 forwardly when said link is released by forward movement of the segment 72. This forward movement of the plate 75 causes its lower edge to be positioned immediately over a projection 77 on the escapement bar 12, thereby preventing operation of said escapement bar and of the keys. This is effective to prevent operation of the number keys 2 and also prevents operation of the tabulating keys which will be locked by engagement of the projection 42 (Figs. 11 and 12) on the tabulating key bail under the hook 43 on the escapement bar. Return of the carriage and other parts, including the shaft 21 and the segment 72 thereon, causes the link 74 to move the plate 75 from its position above the projection 77, thereby releasing all of the keys for other operations.

Figures 1, 2:
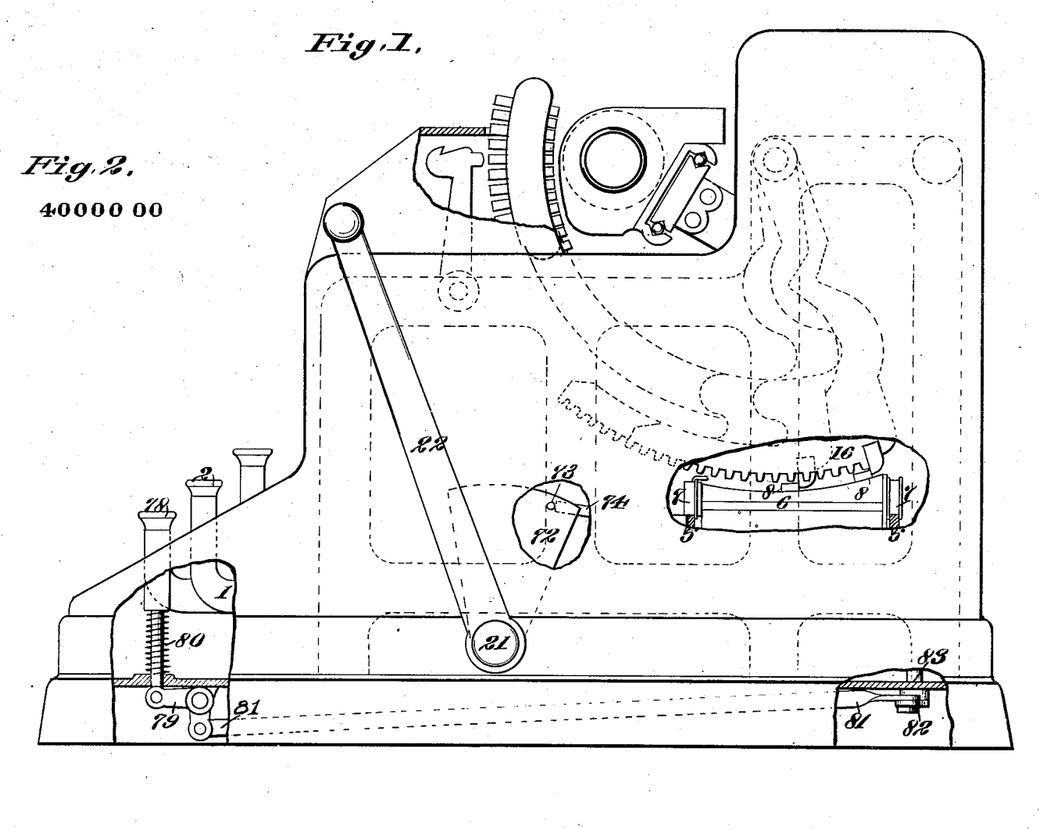
Figure 1 is a side elevation with parts of the case removed, of a machine of the cross carriage type embodying the present invention.
Fig. 2 illustrates a number set up or registered in the carriage by the single operation of two keys.

On some occasions, after a number has been set up in the carriage, it is desirable to move the carriage one or more spaces toward idle position without clearing the entire number from the carriage. For accomplishing this I have provided a back-spacing mechanism including a key and connections whereby said key may be operated to move the carriage step by step toward its idle or rest position. The key 78 has a stem projecting through the base of the machine below which it is pivoted to one arm of the bell crank lever 79. A spring 80 encircling the key stem operates to restore the key and the connected parts to idle position after each operation. A link 81 connects the other arm of the lever 79 with an arm 82 (Fig. 1) on the lower end of a shaft 83 extending through the base of the machine. An arm 84 attached to the upper end of the shaft 83 has connected thereto a link 85 extending forwardly and having its front end pivoted to an arm 86 pivoted to the escapement shaft 11. A pawl or hook 87 is supported by an arm 86 and in idle position rests against an adjustable abutment 88. A toothed segment 89 is integral or rigid with the part 20 previously referred to as being rigid upon the shaft 11. Depression of the key 78 will, through the connections just described, swing forwardly the arm 86 and cause the pawl or hook 87 carried by said arm to become engaged with the toothed segment 89, said pawl being actuated by a spring 87$^a$ effectively to engage said segment. The key 78 has sufficient movement to move the segment 89 and thereby rotate the shaft 11 and its connected parts a distance sufficient to move the carriage one space toward idle position. Another arm 90 attached to the shaft 83 has a link 91 pivoted thereto extending forwardly and guided by the shaft 11. A vertical extension 92 (Figs. 19 and 21) on the front end of the link 91 has a lateral extension 93 thereon. Depression of the key 78 will also move the link 91 forwardly and cause the projection 93 on said link to be engaged by the roller 51 on the projections on the escapement pins to engage therewith, thereby pushing outwardly the escapement pins as they pass said projection 93. This device is necessary in order to adjust the escapement pins in lower orders which may have been retained in inoperative position by previous manipulation of any of the tabulating keys. A spring 94 connecting the link 85 with the base of the machine assists in restoring the parts to idle position after each operation. The projection 92 on the link 91 extends in front of a bracket 95 connected to the sliding frame part 96 supported under the escapement segment. Said frame part is supported by a movable arm 97 (Figs. 11 and 14) provided with a slot, similar to the holes 46, through which the escapement shaft 11 extends. The rear end of the arm 97 has an elongated opening in which is mounted a roller 98 supported on the lower end of the arm 99 attached to the rear rail 5. The roller 98 is grooved, the flanges formed by the grooves embracing said arm 97 and thereby sustaining said arm in proper adjustment.

The frame part 96 is a restoring device whereby the escapement pins 49 are automatically restored to idle or retracted position when the carriage and the escapement return. An arcuate portion 100 on the part 96 extends around in front of all the projections 50 (Fig. 15). The parts 96 and 100 are held in advanced position away from the projections 50 by a spring 100$^a$ extending therefrom to the escapement bar 12. When the carriage and escapement return to their home or idle position a projection 101 on the frame part 96 is encountered by a cam shoulder 102 on the escapement plate 4, and is thereby forced rearwardly, causing the part 100 to engage the projections 50 and thereby retract all of the escapement pins. The carriage and escapement then assume their idle positions in which the pawl 54 engages the tooth 53. In this position the spring 100$^a$ holds the frame 96 and 100 advanced out of engagement with the escapement pins to permit movement of said pins by the keys.

In operation of the machine the number keys 2 may be operated consecutively to set up any desired numbers in the carriage, said keys being operated the same as in the machines herein referred to. Whenever it is desired to move the carriage two or more spaces, the proper tabulating key 23 will be depressed. For moving the carriage two spaces, the key 23 at the right with respect to the operator will be depressed, thereby moving the connected link 33, which, through its connections, will move the proper link 45 and thereby press outwardly the second pin 49 on the escapement segment beyond that pin with which the escapement pawl 54 engages. This operation of the tabulating key also moves the bar 38, thereby operating the bail 36. The bail 36 as described has a pin 42 for lifting the escapement bar (Fig. 12), thereby permitting the actuating device for the carriage to rotate the shaft 11 until stopped by the pin 49 which had just been positioned. This operation is the same for all of the tabulating keys, each tabulating key being operable effectively to cause the carriage to move the number of spaces indicated by said key from whatever position the carriage may occupy. After the carriage has thus been moved any number of spaces by the proper tabulating keys, any other figure keys may be operated effectively to move the carriage step by step and set up therein the remaining digits of the number. This feature constitutes one of the principal differences between the subject matter of this application and the joint application No. 486,498 above referred to.

The back space mechanism may be operated at any time to move the carriage one or more spaces, as desired, toward idle position, and thereby throw out one or more of the last digits struck on the keys.

I am aware that there may be modifications and alterations in the construction and arrangement of the parts embodying this invention without departure from the spirit and scope of the invention, and I do not restrict myself to identical features of construction or arrangement, but

What I claim and desire to secure by Letters Patent is—

1. In an adding machine, a series of rows of pins arranged in numerical orders, keys operable to set selected pins in said orders successively to represent numbers, mechanism for bringing the pins of the several orders successively under control of said keys whereby any key may set a corresponding pin in each of said orders, means controlled by each key for moving the corresponding pins in one direction, and means under control of all of said keys operable to move another pin in the several numerical orders successively in another direction.

2. In an adding machine, the combination of a series of key levers, a series of rows of pins arranged in numerical orders, the pins in each row corresponding to said levers, respectively, means whereby each lever will move its corresponding pin in one of said orders in one direction at each operation of said lever, means controlled by each of said levers for moving another pin in the same order in another direction at each operation, and mechanism for bringing all of said rows of pins successively under control of said levers, substantially as described.

3. The combination with a carriage, means for moving said carriage laterally, a shaft controlling the movement of said carriage, and keys for controlling the operation of said shaft in one direction, of an arm pivoted on said shaft, an element rigid on said shaft adjacent to said arm, a movable device on said arm for engaging said element, and connections for actuating said arm and engaging said device with said element effectively to rock said shaft to return said carriage step by step to idle position.

4. The combination with a carriage, means for actuating said carriage in one direction, and a shaft controlling movement of said carriage and being operative to move said carriage in the opposite direction, of a pivoted arm, an element rigid on said shaft, a device on said arm adapted to engage with said element, means normally holding said device disengaged from said element, means for actuating said arm, and means for engaging said device with said element when said arm is actuated effectively to rock said shaft and thereby move said carriage step by step toward idle position.

5. In an adding machine, a carriage, a row of "0" pins supported in said carriage, rows of pins for other digits supported in said carriage, devices for moving selected ones of said last-named pins in one direction and corresponding ones of said "0" pins in another direction to represent numbers, means for moving said carriage under control of said devices, means for moving said carriage to its home position, and means for moving in one direction the "0" pins which had been moved by said devices and in an opposite direction the digit pins which had been moved by said devices, when said carriage is moved to its home position, substantially as described.

6. The combination with a carriage, a series of "0" pins therein normally in operative position, digit pins therein normally in inoperative position, and an escapement controlling lateral movement of the carriage, of a series of digit keys operable to set up said digit pins and to move said "0" pins and to cause said escapement to operate, and mechanism operable to cause any one or more of said digit pins to be returned to idle position while others thereof remain in their operative positions, substantially as described.

7. In an adding machine, a carriage, a series of pins therein normally in operative position, other series of pins therein normally in inoperative position, a series of keys operable to move said first named pins to inoperative position and to move said last named pins into operative position, and mechanism operable to restore any desired number of said pins to their idle position while others remain operative, substantially as described.

8. In an adding machine, a series of rows of pins arranged in numerical orders, a series of key levers for setting said pins to represent numbers, mechanism for bringing the pins of the various orders successively under control of the same key levers, means under control of each key lever for moving a corresponding pin in each of said orders successively in one direction, and a device under control of all of said key levers for moving another pin in each order in another direction concurrently with the movement of the corresponding pin, substantially as described.

9. In an adding machine, a support, series of pins mounted in numeral orders in said support, a series of manually operable levers, mechanism controlled by said levers for bringing successive orders of said pins into position to be operated by said levers, elements actuated by said levers effectively to engage with and move in one direction a corresponding pin in each of the numerical orders successively, and a device under control of all of said levers for actuating another of said pins in a direction opposite to the movement of the pin corresponding to said levers as aforesaid, substantially as described.

10. In an adding machine, the combination with a series of racks, stops arranged in numerical orders for preventing movement of said racks, stops arranged in numerical orders for limiting movement of said racks, a series of keys, mechanism controlled by said keys for positioning successive orders of said stops in position to be operated by said keys, parts actuated by said keys for moving said second-named stops successively to position to limit movement of said racks, and a device controlled by all of said keys for moving said first-named stops positively to position to enable said racks to operate, as an incident to the operation of said keys and said second-named stops.

11. In an adding machine, the combination with a series of racks, stops for preventing movement of said racks, and series of stops arranged in numerical orders for limiting movement of said racks, of levers for moving said second-named stops positively to position to limit movement of said racks, means for bringing said stops successively to position to be operated by said levers, and means for moving one of said first-named stops positively to position to enable one rack to operate, incidentally to the operation of each lever, substantially as described.

12. In an adding machine, differential mechanism comprising a series of stops arranged in numerical orders and including stops for the several digits in each order, keys for setting said stops to represent numbers, means for positioning successive orders of said stops in position to be operated by said keys, and devices controlled by each key for positively actuating a corresponding stop in one direction and another stop in another direction in each of said orders by successive operations of said key, substantially as described.

13. In an adding machine, the combination of a movable carriage, series of pins in said carriage arranged in numerical orders and including pins for the digits in each order, a series of key levers, mechanism whereby successive operations of any of said key levers will move a corresponding pin positively in one direction in each of said orders successively, a lever for moving others of said pins in an opposite direction, and means under control of said key levers for actuating said second-named lever effectively to move said other stops successively, substantially as described.

14. In an adding machine, a laterally movable support, pins in said support settable to represent numbers, means for moving said support to and from its idle position, means for raising certain of said stops when said support is moved toward idle position, and means for depressing the remainder of said stops when said support is moved toward its idle position.

15. In an adding machine, a laterally movable support, a series of "0" pins in said support, series of pins representing digits in said support, means for setting said pins to represent the digits of numbers, means for moving said support incidentally to the setting of said pins, means for restoring said support to idle position after said pins have been set, and means for depressing the pins for representing digits and raising the "0" pins incidentally to the movement of said support to its idle position.

16. In an adding machine, a series of rows of pins arranged in numerical orders and the pins in each row corresponding to digits, a series of digit key levers, mechanism controlled by said key levers for moving said rows of pins to position to be acted upon in successive orders by said key levers, means whereby each lever will move one of said pins in one direction at each operation, and a lever under control of all of said key levers for moving another of said pins in another direction on each operation of any of said key levers, substantially as described.

17. In an adding machine, differential mechanism comprising a series of rows of pins arranged in numerical orders and including a series of pins in each order corresponding to digits, a series of key levers corresponding to the digit pins in one of said orders, mechanism under control of said key levers for positioning the several rows of pins successively in position to be acted upon by said key levers, means whereby each of said key levers will move in one direction a corresponding digit pin upon each operation of said key lever, a lever for moving others of said pins in another direction, and means for actuating said last-named lever by any of said key levers to move in another direction another pin in the same numerical order with the pin acted upon by the key lever which may be operated, substantially as described.

18. In an adding machine, differential mechanism comprising a series of pins normally in position to represent "0" and arranged in numerical orders, and other series of pins arranged in numerical orders and settable to represent the digits of numbers, in combination with a key lever for each pin in one of said second-named series of pins, means whereby each of said key levers will move a corresponding pin in one of said second-named series of pins on each operation of said lever, mechanism controlled by said key levers for positioning successive orders of said pins in position to be moved by said key levers, and a device under control of all of said key levers for moving one of said "0" pins on each operation of any of said key levers and in a direction opposite from the direction in which the corresponding digit pin is moved, substantially as described.

19. In an adding machine, the combination with series of pins settable to represent numbers, a laterally movable support in which said pins are mounted, means for setting said pins to represent numbers, means for moving said support to and from its normal position, and means for depressing certain of said pins and raising others of said pins incidentally to movement of said support to its idle position.

20. In an adding machine, the combination with a series of pins, a lever for actuating said pins, means for moving said pins successively adjacent to said lever, a series of numeral levers, and connections operated by said numeral levers effectively to operate said first-named levers.

21. In an adding machine, the combination with series of digit pins arranged in numerical orders, a lever for actuating certain of said digit pins, a series of numeral levers for actuating others of said digit pins, means for actuating said first-named lever by said numeral levers, and mechanism controlled by said numeral levers for moving said pins to position different orders thereof successively, adjacent to said levers, substantially as described.

22. In an adding machine, the combination with series of pins arranged in numerical orders, a device for actuating certain of said pins, key actuated elements for moving others of said pins, connections whereby said key actuated elements will operate said device, mechanism for positioning successive orders of said pins in combination to be operated, and mechanism for restoring said pins to idle position, substantially as described.

23. In an adding machine, a movable carriage, series of digit pins mounted in said carriage, mechanism for setting said pins to represent numbers and moving said carriage from a certain starting point, mechanism for restoring said carriage to its starting point, and means for moving certain of th[...]s representing the digits of the number [in] one direction and moving other pins i[n an]other direction when said carriage is moved toward its starting point, substantially as described.

24. In an adding machine, a carriage, a row of "0" pins therein normally in operative position, other rows of pins therein normally in inoperative position, a shaft controlling movement of said carriage, digit keys for moving said "0" pins to idle position and moving said digit pins to operative position, means for controlling movement of said shaft by said keys, tabulating devices for controlling said shaft independent of said keys whereby the carriage may be caused to move laterally, and mechanism for moving said shaft to actuate the carriage any desired distance toward idle position from whatever position said carriage occupies, substantially as described.

25. In an adding machine, the combination with a carriage, a shaft controlling movement of said carriage, and means for setting up numbers in said carriage and moving said carriage under control of said shaft, of a pivoted arm, and element rigid upon said shaft, means for establishing a connection between said arm and said element, means for actuating said arm and thereby said element and said shaft effectively to move said carriage step by step toward idle position to erase the digits of the number one by one from said carriage, and means for disconnecting said arm from said element automatically.

In testimony whereof I hereunto affix my signature to this specification, in the presence of two witnesses, this 16th day of August, 1909.

BIRNEY DYSART. [L. S.]

Witnesses:
J. D. RIPPEY,
H. E. COLLINS.

Copies of this patent may be obtained for five cents each, by addressing the "Commissioner of Patents, Washington, D. C."